United States Patent [19]

Suganuma et al.

[11] Patent Number: 4,604,696

[45] Date of Patent: Aug. 5, 1986

[54] DOCUMENT ISSUING APPARATUS FOR PRINTING A SET OF TRANSACTION CONTROL SLIPS FOR EACH OF MANY TRANSACTIONS

[75] Inventors: Saburo Suganuma; Hiroyuki Kataoka, both of Kanagawa, Japan

[73] Assignee: Fuji Xerox Co., Ltd., Tokyo, Japan

[21] Appl. No.: 578,568

[22] Filed: Feb. 9, 1984

[30] Foreign Application Priority Data

Feb. 10, 1983 [JP] Japan .................................. 58-19792

[51] Int. Cl.[4] .............................................. G06F 15/22
[52] U.S. Cl. .................................... 364/401; 364/408; 364/406; 355/14 C; 355/14 R; 400/76; 400/279; 101/426
[58] Field of Search ................................ 364/400-401, 364/406, 408, 900 MS File; 355/14 R, 14 CU, 14 C, 18, 77-78, 132-133; 101/1-2, 45-47, 113, 426, DIG. 3, DIG. 18, DIG. 25; 400/17, 61-63, 76, 279

[56] References Cited

U.S. PATENT DOCUMENTS

| 4,028,680 | 6/1977 | Vittorelli | 400/17 X |
| 4,045,780 | 8/1977 | Kashio | 364/900 |
| 4,264,808 | 4/1981 | Owens et al. | 364/406 X |
| 4,309,101 | 1/1982 | Nakamura et al. | 355/14 R |
| 4,379,631 | 4/1983 | Kitamura | 355/14 R |
| 4,397,542 | 8/1983 | Brodesser | 355/14 R |
| 4,403,301 | 9/1983 | Fessel | 364/900 |
| 4,405,225 | 9/1983 | Perrault | 355/14 R |
| 4,459,678 | 7/1984 | McCaskill et al. | 364/900 |
| 4,481,603 | 11/1984 | McCaskill et al. | 364/900 |
| 4,505,576 | 3/1985 | Sugiura et al. | 355/14 R |

Primary Examiner—Gary V. Harkcom
Attorney, Agent, or Firm—Finnegan, Henderson, Farabow, Garrett & Dunner

[57] ABSTRACT

A document issuing apparatus wherein images of different forms and images of data to be printed on the forms are stored in memory. Form images and data images are combined, edited, and printed to produce a series of sets of transaction control slips in an order dependent upon classification information contained in the data to be printed.

4 Claims, 7 Drawing Figures

FIG. 4

| | DESTINATION | GIFT'S NAME | GIFT'S PRICE | GIFT'S CODE |
|---|---|---|---|---|
| 1 | NAME ① AND ADDRESS | | 100 | 100 |
| 2 | NAME ② AND ADDRESS | | 200 | 200 |
| 3 | NAME ③ AND ADDRESS | | 300 | 300 |
| 4 | NAME ④ AND ADDRESS | | 100 | 100 |
| 5 | NAME ⑤ AND ADDRESS | | 300 | 300 |
| 6 | NAME ⑥ AND ADDRESS | | 100 | 100 |
| 7 | NAME ⑦ AND ADDRESS | | 300 | 300 |
| 8 | NAME ⑧ AND ADDRESS | | 200 | 200 |
| 9 | NAME ⑨ AND ADDRESS | | 100 | 100 |
| 10 | NAME ⑩ AND ADDRESS | | 100 | 100 |

ORDER FORM

FROM NAME OF PURCHASER    STORE NAME

FIG. 5

| DESTINATION | | GIFT'S NAME | GIFT'S PRICE | GIFT'S CODE |
|---|---|---|---|---|
| 1 | NAME ① AND ADDRESS | 100 | | 100 |
| 2 | NAME ④ AND ADDRESS | 100 | | 100 |
| 3 | NAME ⑥ AND ADDRESS | 100 | | 100 |
| 4 | NAME ⑨ AND ADDRESS | 100 | | 100 |
| 5 | NAME ⑩ AND ADDRESS | 100 | | 100 |
| 6 | NAME ② AND ADDRESS | 300 | | 200 |
| 7 | NAME ⑧ AND ADDRESS | 300 | | 200 |
| 8 | NAME ③ AND ADDRESS | 300 | | 300 |
| 9 | NAME ⑤ AND ADDRESS | 200 | | 300 |
| 10 | NAME ⑦ AND ADDRESS | 200 | | 300 |

ORDER FORM

FROM | NAME OF PURCHASER | STORE NAME

FIG. 6

| | |
|---|---|
| TO NAME ① AND ADDRESS — GIFT'S NAME 100 — GIFT'S CODE <br> FROM NAME OF PURCHASER <br> STORE NAME | 24 |
| TO NAME ① AND ADDRESS — GIFT'S NAME 100 <br> FROM NAME OF PURCHASER <br> STORE NAME | 25 |
| TO NAME ① AND ADDRESS — GIFT'S NAME 100 — GIFT'S CODE <br> FROM NAME OF PURCHASER <br> STORE NAME | 26 |
| TO NAME ① AND ADDRESS — GIFT'S NAME 100 — GIFT'S CODE <br> FROM NAME OF PURCHASER <br> STORE NAME | 27 |

39

DOCUMENT ISSUING APPARATUS FOR PRINTING A SET OF TRANSACTION CONTROL SLIPS FOR EACH OF MANY TRANSACTIONS

BACKGROUND OF THE INVENTION

1. FIELD OF THE INVENTION

This invention relates to an apparatus which produces sets of control slips containing commercial transaction information.

2. DESCRIPTION OF THE PRIOR ART

Department stores undertake commercial transactions in which a customer requests that one or more gifts purchased by that customer be delivered to various recipients. The department store prepares, as a result of transaction information provided by that customer, a written order form bearing transaction control information such as the customer's name, the names and addresses of the recipients of the gifts and a description of the gifts. The department store then uses this transaction control information on the order form to prepare a set of transaction control slips also referred to as delivery slips. Each set of transaction control slips is used by the department store in order to locate the gift selected by the customer, wrap the gift, deliver the gift to a delivery station, deliver the gift from the delivery station to the ultimate destination, and receive a signed receipt from the ultimate recipient. The signed receipt is returned to the department store to complete billing and record keeping procedures.

Accordingly, a single set of transaction control slips is required for each gift. A set of such transaction control slips commonly includes the following individual slips:

(1) A work slip which is used in a delivery department of the store where items ordered for delivery are taken and wrapped for delivery. The work slip may also serve to clear accounts;

(2) A tag slip which is used as a label attached to the ordered item to be delivered;

(3) A takeout slip which is used at the delivery station of the department store for dispatch; and (4) A verification slip which is used as a receipt and upon which the signature of the recipient is written to certify the delivery of the ordered item to the intended destination.

Information from the original order form for the gifts, such as the name and address of the customer, the name and address of each person to receive an ordered item or gift, the type item or gift to be received, the number of ordered items or gifts, are entered as common transaction control information on each slip of a set of transaction control slips for each gift. However, each slip of a set of transaction control slips may be different in form and may require different portions of the transaction control information. Moreover, the various slips making up each set of transaction control slips for each gift are forwarded, as one set of slips, to the gift storage, gift wrapping or similar department responsible for filing the customer's request and to all subsequent locations within the department store organization which are necessary to complete delivery of the gift. Accordingly, it is essential that the individual slips of each set of transaction control slips be arranged in the proper order so that each slip can be removed as various steps in the delivery process are completed.

In the case of a small order, usually the customer enters transaction control information directly on the individual slips of a set of transaction control slips. Each department of a department store may have a booklet which has blanks of each of the various slips which make up a set of transaction control slips, so that one such set may be prepared by entering predetermined data on the top slip with carbon sheets inserted therebetween. Of course, when the transaction control slips are made up of pressure sensitive paper, the insertion of carbon sheets is unnecessary.

On the other hand, in the case of a large order, for example in the case where commodities are delivered to more than ten destinations, usually the department store prepares the required sets of transaction control slips according to transaction control information submitted by the customer on a prepared order form.

During a rush period, such as a holiday season in which a department store is required to deliver a large number of gifts, the department store may issue sets of transaction control slips according to: (1) a spirit system, (2) a copy system (or an overlay system), and (3) a handwritten system. According to these systems, a set of delivery slips is prepared by transferring or copying necessary data onto preprinted sets of transaction control slips from the completed order form.

For example, using the spirit system, an order form prepared by the customer is chemically treated and the slips of a set of transaction control slips are printed by a chemical based printer. However, each of the slips of a set of transaction control slips must be independently printed and it is, accordingly, impossible with such a system to print a set of transaction control slips in one action. In addition, it is necessary that blank sets of transaction control slips be preprinted.

In the copy system, an overlay is prepared for each customer bearing certain transaction control information. This overlay is used to prepare the various slips of a set of transaction control slips. However, it is necessary to have the same number of overlays as the number of different forms of slips making up a set of transaction control slips. The formation and maintenance of these overlays and the copying operation have proved troublesome.

In the handwritten system, necessary transaction control data is entered into a preprinted set of transaction control slips using pressure sensitive paper by referring to the written order originally prepared by the customer. In this case, it is difficult to enter the necessary data correctly at all times, and the work efficiency is extremely low.

Since a busy department store prepares a large number of different sets of transaction control slips to fulfill many gift orders, the slips of each set often become mixed up and out of order or incorrectly issued in duplicate. Accordingly, much time and labor must be devoted to checking the transaction control slips of each set, causing the conventional procedures to be uneconomical and inefficient.

Moreover in any of the above described systems, it is necessary to sort out the prepared sets of transaction control slips according to the kinds of commodities to be delivered, or according to the locations to which these commodities are to be delivered. This sorting operation is uneconomical and low in efficiency, requiring a lot of time and labor.

OBJECTS AND SUMMARY OF THE INVENTION

Accordingly, an object of the subject invention is to provide a document issuing apparatus in which transaction control information provided in a written order is automaticaly transferred to sets of transaction control slips, and these sets of transaction control slips are automatically sorted in a predetermined order depending upon the submitted transaction control information.

More specifically, it is an object of the present invention to produce sets of transaction control slips in an order determined by classification data included in transaction control information provided by a customer on an order form.

To achieve the foregoing objects, and in accordance with the purposes of the invention as embodied and broadly described herein, a document issuing apparatus is provided for printing transaction control information including classification information presented on an order form for each of a plurality of transactions onto individual sets of transaction control slips, which document issuing apparatus comprises: (a) optical means for reading from the order forms transaction control data representing transaction control information for a plurality of transactions, with this transaction control data including classification data; (b) storage means for storing the transaction control data and for also storing format data representing the format of the control slips making up a set of transaction control slips; (c) processing means for ordering the control data for a plurality of transactions in response to the classification data contained in the control information for each transaction and for organizing the control data for each transaction into a format compatible with the format of the control slips of a set of transaction control slips; and (d) printing means for simultaneously printing both the transaction control data and the format data to form a set of transaction control slips for each transaction, the sets of transaction control slips being printed in an order determined by the classification data for each transaction.

BRIEF DESCRIPTION OF THE DRAWINGS

FIG. 4 is a plain view showing an example of an order form;

FIG. 5 is an explanatory diagram showing the image of the order form of FIG. 4 with the contents of which being arranged in accordance with the teachings of the subject invention;

FIG. 6 is an explanatory diagram showing the image of a set of transaction control slips which have been composed in accordance with the teachings of the present invention.

DETAILED DESCRIPTION OF THE PREFERRED EMBODIMENT

Figure 1:
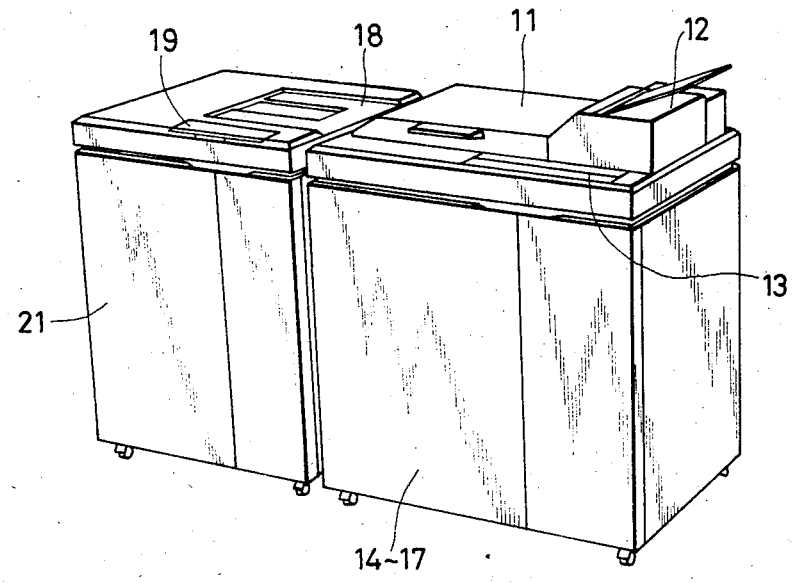
FIG. 1 is an external view of a document issuing apparatus according to the teachings of the present invention.

FIG. 1 shows an external view of a first example of a document issuing apparatus according to the subject invention. The apparatus consists of two devices, namely a document reader and a document printer physically connected together. More specifically, an optical reader 11 is provided for reading data contained on documents presented to reader 11. An automatic feeder mechanism is provided for sequentially feeding such documents to optical reader 11. An operating panel 13 is installed to provide operator input information.

Figure 2:
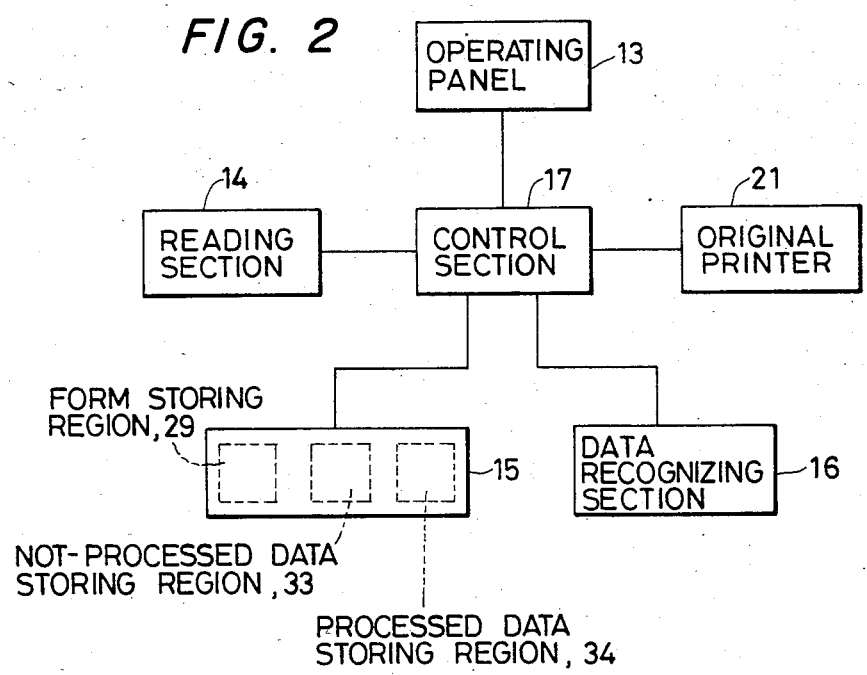
FIG. 2 is a block diagram showing the essential components of the subject invention.

A computer mechanism is employed in connection with optical reader 11 which includes a data reading section 14, a data storage section 15, a data recognizing section 16, and a control section 17, all of which are described in more detail below in connection with FIG. 2. Control section 17 basically provides control over sections 14–16. Sections 14–17 may for example comprise a microprocessor unit.

An original document discharging tray 18 is installed on the top left-hand side of the device as shown in FIG. 1 and a digital printer or printing means 21 is provided inside the left-hand device. A document or slip which has been printed is discharged into a discharging tray (not shown) through a discharging opening formed on the left side wall of the left-hand device.

Figure 3:
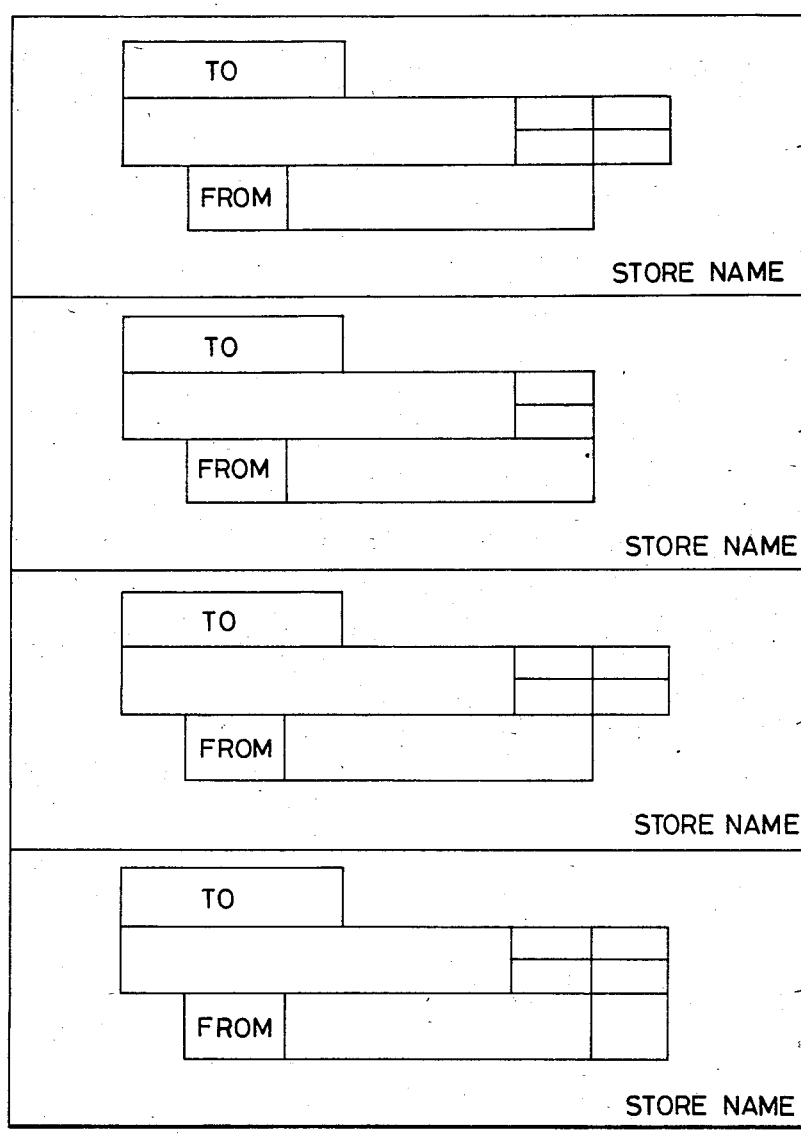
FIG. 3 is a plain view of a sheet on which blank control slips of a set of transaction control slips have been printed.

The steps of forming a set of transaction control slips will now be described. First, an operator inputs a set of blank transaction control slips into the apparatus of FIG. 1 using the optical reader 11 and feeding mechanism 12. FIG. 3 shows one example of a blank set of transaction control slips 23. Set 23 includes individual blank transaction control slip forms; namely, work slip form 24, tag slip form 25 (to be attached to the commodity), takeout slip form 26, and verification slip form 27. The operator then places the blank set of transaction control slips 23 on optical reader 11 of the device of FIG. 1 and presses a form inputting start button (not shown) on operating panel 13. When inputting different formats of control slips making up a set of transaction control slips, form identifying codes are also inputted by the operator using appropriate control indicators on operating panel 13.

When the form inputting start button is depressed, control section 17 (FIG. 2) causes reading section 14 to start a reading operation. That is, as should be understood to those skilled in the art, a fluorescent lamp or the like (not shown) is included in optical reader 11 and turned on to scan the document on which the blank set of transaction control slips 23 is printed. The optical image of set 23 is converted into electrical signals by an image sensor with the aid of a typical optical system which is also well-known to those skilled in the art. The electrical signal is binary-coded into a digital signal. This digital signal is transferred to memory section 15 under the control of control section 17. Accordingly, format data representing the format of the control slips making up a set of transaction control slips 23 is semi-permanently stored in memory section 15. Specifically, this format data may be stored in Form Storing Region 29 of memory section 15.

Memory section 15 may, for example, comprise a magnetic disk or optical disk. The format data stored in Form Storing Section 29 is read every time a set of transaction control slips is to be printed by the apparatus. That is, it is unnecessary to input the format data with each succeeding set of transaction control slips issued, except when the format of such control slips has been changed or a different set of transaction control slips is to be employed. If a second form of transaction control slips is to be employed and format data representing this new form of control slips had previously been inputted into Form Storing Region 29, instead of re-inputting such format data, the operator may simply indicate which of the different sets of transaction control slips are to be issued using an appropriate indicator on operating panel 13.

Once the appropriate data has been stored in Form Storing Region 29, the operator then inputs transaction control information using an order form. Specifically, a gift purchasing order form 31 as shown in FIG. 4 may be used. Order form 31 has ten lines each including the names and addresses of persons to whom a gift is to be delivered, and the nomenclature, unit price and code for each such gift. For simplification and illustration, in FIG. 4 the names of persons to whom gifts are delivered are represented by symbols 1 through 10 . The address and name of a customer who requests the department store to deliver those gifts is entered in the lower portion of order form 31.

The operator sets gift purchasing order form 31 on optical reader 11 or, if more than one order form is employed, the operator employs automatic feeder 12. The operator then specifies: (i) the type of set of transaction control slips to be issued for each gift, and (ii) the sorting method to be employed. This information is inputted through use of the operation panel 13. The operator then depresses a print start button on operator panel 13 (not shown). Thereupon, the gift purchasing order form 31 is fed to optical reader 11, and its image is read as is wellknown to those skilled in the art. The resultant electrical signal is binary-coded into a digital signal which is transferred to the memory section 15 (FIG. 2) under the control of control section 17. Transaction control information on form 31 (namely, destination information, gift information and purchaser information) is stored in a Not Processed Data Storing Region 13 of memory section 15. In the case where a plurality of gift purchasing order forms 31 are set on the automatic feed mechanism 12, the images of these order forms are read sequentially one after another and stored in region 33 of memory section 15.

After all of the order forms to be processed have been read, the document issuing apparatus of the subject invention carries out electrical editing of the transaction control information stored in Not Processed Data Storing Region 33. This editing is accomplished in accordance with classification data contained in the stored transaction control information. Such classification data may, for example, comprise the gift's name or gift's code data when sorting is to be accomplished on a commodity classification basis, or the classification data may include the zip code or other location identifying aspect of the destination address information if sorting is to be accomplished on a location basis.

Once the operator has indicated the storage method, using operating panel 13, the contents of the transaction control information data stored in region 33 for each order form are rearranged separately according to the classification data upon which the sorting is to be accomplished. For example, if commodity sortings is to be accomplished, the transaction control information stored in region 33 is reorganized according to commodity codes. To accomplish this reorganization, control section 17 reads the data stored in Not Processed Data Storing Region 33 for every customer, and transfers that data to Data Determining Section 16 (FIG. 2). Section 16 is programmed to perform a recognition function as is well-known to those skilled in the art for determining the receipt of a particular form of operator selected classification data from the received data previously stored in the Not Processed Data Storing Region 33 of memory section 15. Once the commodity codes have been read, the contents of each order form 31 are grouped separately according to these commodity codes and then stored in the reordered form in Processed-Data Storing Region 34 of memory section 15.

FIG. 5 shows the rearranged contents of order form 31 as the image of a new order form 35. Instead of actual conversion of the order of data, a method may be employed in which a conversion table is utilized, as would be readily apparent to those skilled in the art. Moreover, the commodity codes may be more readily ascertained if bar codes are entered in the gift purchasing order form 31.

After the image of order form 31 has been converted or an appropriate conversion table has been formed by data determining section 16, the resultant data stored in Processed Data Storing Region 15 is edited in accordance with the format data stored in Form Storing Region 29. For example, with respect to a commodity code whose code number is the smallest, coordinates are specified through use of the stored format data so that specific data in the Process Data storing Region 34 such as destination (name and address), gift name, unit price and code, together with the name and address of the customer are read out sequentially, and are superimposed under the operation of control section 17 on the appropriate locations on the set of transaction control slip forms whose format data is stored in Form Storing Region 29. The image is thus superimposed by the combination of format data in Form Storing Region 29 and processed data in Processed Data Storing Region 34. Such superimposed data may be temporarily stored in memory section 15 or may be immediately directed to digital printer 21.

FIG. 6 discloses a set of transaction control slips 39 which is formed by using the transaction control information from first line 37-1 and line 38 of order form image 35 (FIG. 5) which was derived from the transaction control information of order form 31 (FIG. 4). The data electronically transferred onto control slips 24-27 from gift purchasing order form 31 are somewhat different from one another. However, such transfer can be readily realized by specifying the ranges of coordinates of the location of specific information for each of forms 24-27.

Digital printer 21 preferably comprises a laser oscillator, an optical scanning system, and a photosensitive member for printing data in accordance with the principles of zerography. The image which comprises a set of transaction control slips 39 is supplied as a serial bit signal to digital printer 21 which is similar to the signal which is obtained by optically scanning an original blank form of the set of transaction control slips which make up set 39, with transaction control data suitably superimposed. In digital printer 21, a laser beam is modulated with this input signal to scan a photosensitive member, so that a latent image is formed thereon. This latent image is utilized to form a set of transaction control slips on which the toner image has been fixed. This final set is a hard copy of the image 39 shown in FIG. 6, which, in fact, is a series of four control slips to make up a complete set.

The resultant document upon which the image 39 is printed is preferably cut into four slips by a cutter located within digital printer 21. These four slips 24–27 are combined together with a stapler for each gift and are discharged into the discharging tray of printer 21. In other words, a first set of transaction control slips 24–27 in which transaction control data from first line 37-1 of order form image 35 has been entered are discharged. Subsequently, a second set of transaction control slips 24–27 with information relating to second line 37-2 of order form image 35 are then discharged, and so forth. Accordingly, in each set of transaction control slips issued there are four individual control slips 24–27.

The sets of transaction control slips are issued in accordance with the type of commodities to which each set pertains. Therefore, the sets of transaction control slips for a first type commodity are first issued, after which the sets of transaction control slips for the next commodity are subsequently printed out by digital printer 21. Since the individual control slips are issued in the form of a set stapled together, the management of such slips can be easily achieved. When a number of gift purchasing order forms 31 are inputted to the document issuing apparatus of the subject invention, the resultant sets of transaction control slips are outputted while being sorted out separately according to commodities, thereby permitting storage, control and delivery of the commodities to be readily carried out in a remarkably more efficient manner than was heretofore done in the prior art.

The operator can specify other slip sorting methods instead of the above-described method of sorting out sets of transaction control slips according to commodities. For example, when a method of sorting out sets of transaction control slips according to delivery zones is required, the classification data of the stored transaction control data for each order form 31 which relates to recipient's location or delivery zone is used to arrange the contents of the gift purchasing order forms 31 according to these delivery zones. The resultant sets of transaction control slips are issued sequentially in accordance with the applicable delivery zones.

The delivery zones can be discriminated one from the other by referring to the address or postal codes in the "destination" columns of order form 31, or by referring to symbols or codes representing delivery zones which are entered into suitable code columns in advance.

In the case where a large number of commodities are being handled, the order in which sets of transaction control slips are issued may be specified both with commodity codes and delivery zones. In other words, sets of transaction control slips for particular commodities in particular delivery zones are first issued whereafter sets of transaction control slips for different commodities in that same zone or for the same commodities in different zones are subsequently issued.

In the case where sets of transaction control slips are issued according to commodities, the slip issuing method may be so modified such that sets of slips are prepared not only in the order of increasing commodity code numbers, but also in the order of decreasing handling quantities or in the order specified.

Figure 7:
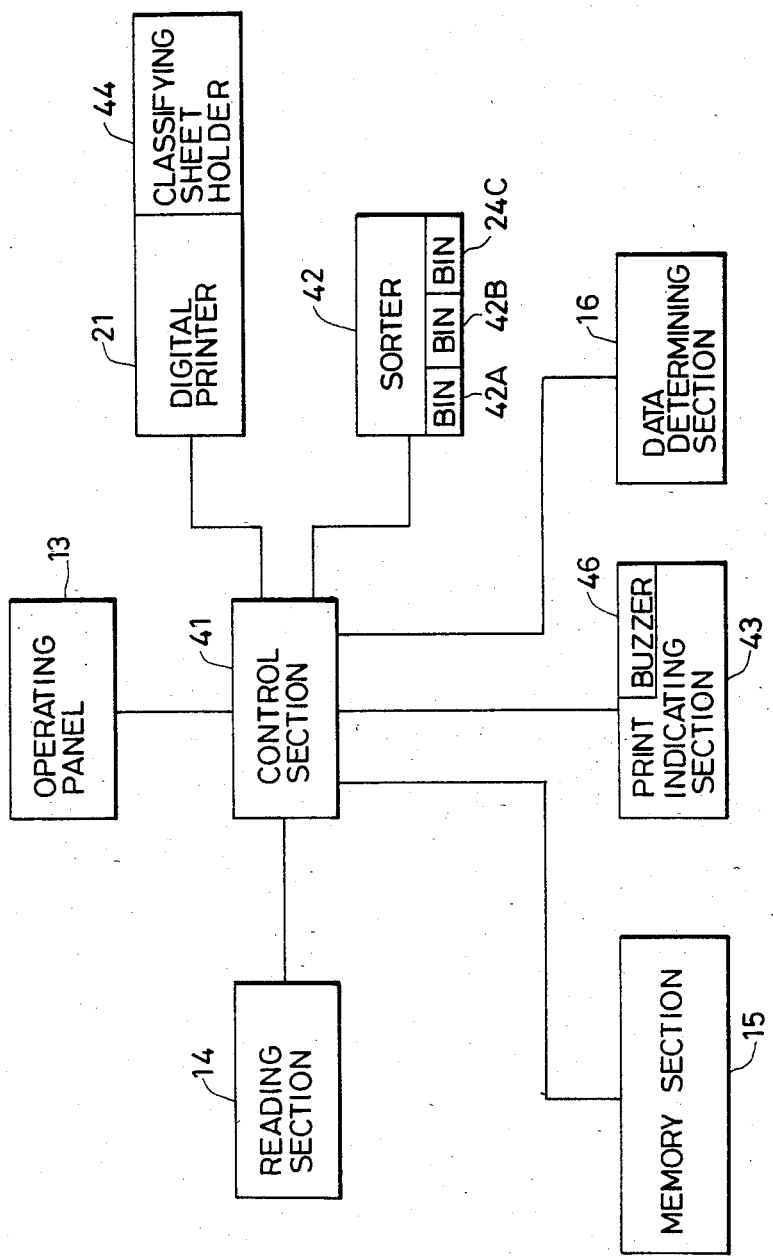
FIG. 7 is a block diagram showing the essential components of a second embodiment of a document issuing apparatus incorporating the teachings of the present invention.

FIG. 7 shows a block diagram arrangement of a second example of the document issuing apparatus of the subject invention. In FIG. 7, those components which have previously been described with reference to FIG. 2 are designated by the same reference numerals. In the case of these particular components, the preceding description is equally applicable to the arrangement shown in FIG. 7.

The apparatus of FIG. 7 includes a control section 41 which is connected to operating panel 13, reading section 14, memory section 15, and digital printer 21. Control section 41 operates much as control section 17 operates in the arrangement of FIG. 2. However, in FIG. 7 there is further disclosed a sorter 42 and a print indicating section 43 with a buzzer 46 which provides means for indicating the completion of outputting sets of transaction control slips for a particular type of classification data and for otherwise indicating printing conditions.

Sorter 42 has a plurality of bins 42a–c. Sorter 42 distributes the sets of transaction control slips into bins 42a–c according to sorting data under the control of control section 41. For instance, in the case where sets of transaction control slips are outputted separately according to delivery zones, a particular bin 42a–c may be used to receive sets of control slips for a particular delivery zone. Thus, even when the sets of transaction control slips are being outputted sequentially in the order of increasing commodity code numbers, the management of such sets of slips is very simple.

Print indication section 43 operates to indicate, for instance, the total number of sets of transaction control slips printed out and the ratio of sets of slips printed to the number to be printed in total. A buzzer 46 may be operated for a predetermined period after the output to each bin 42a–c has been completed, so that the sets of slips are taken out of such bins by the operator.

Sorter 42 may be disconnected from the document issuing apparatus. That is, the choice of using sorter 42 may be given to the operator by using an instruction from operating panel 13. Other methods of accomplishing the function of sorter 42 may include the utilization of buzzer 46 in print indicating section 43 to indicate when the sets of control slips for a particular delivery zone have been outputted.

If so requested by the operator through setting of operating panel 13, control section 41 may detect when sets of control slips for a particular delivery zone have been outputted, so that the printing operation of digital printer may be stopped while buzzer 46 in print indicating section 43 is continuously operated. When the operator has removed the slips out of the discharging tray, outputting sets of slips for the next delivery zone is commenced. Thus, the slips can be sorted out separately according to classification data without utilization of sorter 42.

In a still different method, control section 41 causes digital printer 21 to output a classifying sheet from classifying sheet holder 44 whenever the sets of slips for a particular classification have been completely outputted. For instance, when all the sets of slips for one delivery zone have been outputted, one red sheet may be discharged from classifying sheet holder 44 into the discharging tray and then the sets of transaction control sheets to the next delivery zone are outputted. Thus, the operator can sort out the sets of transaction control slips through utilization of the red classifying sheets.

It is not always necessary that the classifying sheets are different in color from slips. That is, classifying sheets may be different from the sheets upon which the sets of transaction control slips are printed in size or in material.

It should be apparent from the above description that the apparatus according to the subject invention issues a variety of control slips in sets of transaction control slips while sorting these sets out according to classification data contained therein. Accordingly, these operations can be achieved quickly and accurately.

Furthermore, since format data indicating the form of each control slip of each set of transaction control slips is stored as images, telephone lines or the like can be utilized to issue the slips simultaneously at a number of points over the country. The electronic data can be utilized for processing statistical data or slip data. In addition, since the apparatus of the subject invention issues slips electronically by combining format data with content data, it is unnecessary to use paper on which the forms have been preprinted. Accordingly, the method of inserting paper into the printer is much simpler.

While salient features of the invention have been described with reference to the drawings, it should be understood that the preferred embodiment described herein is susceptible to modifications and alterations without departing from the spirit and scope of the following claims.

What is claimed is:

1. A document issuing apparatus for printing item sale and delivery control information for each of a plurality of transactions, involving the sale and delivery of an item, which information is presented on an order form for each of a plurality of transactions, onto an individual set of transaction control slips for each transaction, said apparatus comprising:
   (a) optical means for reading from a plurality of said order forms, item sale and delivery control data representing transaction control information for a plurality of transactions, said control data including item classification data;
   (b) storage means for storing said sale and delivery control data;
   (c) processing means for ordering said sale and delivery control data for said plurality of transactions in response to said classification data contained in said transaction control information for each transaction, and for organizing said sale and delivery control data for each transaction into a format compatible with the format of said transaction control slips; and
   (d) printing means for simultaneously printing both said transaction control information for each transaction and format data representing the format of said control slips to form a set of said transaction control slips for each transaction, said set of transaction control slips being printed in an order determined by said classification data for each transaction.

2. An apparatus as recited in claim 1 further including a classifying sheet holder for containing sheets which are adapted to distinguish said sets of transaction control slips bearing one form of said item classification data from sets of transaction control slips bearing another form of said item classification data; and wherein said printing means includes means for supplying one of said sheets from said classifying sheet holder whenever printing of sets of transaction control slips bearing certain item classification data has been completed to distinguish said sets from subsequent sets of transaction slips.

3. An apparatus as recited in claim 1 further including a plurality of bins and including a sorter for distributing said sets of transaction control slips into said bins in accordance with said classification data.

4. An apparatus as recited in claim 1 wherein said apparatus further includes print indicating means for indicating when said printing means has completed outputting a group of sets of transaction control slips in accordance with a certain form of classification data.

* * * * *